US011993327B2

(12) United States Patent
Baudouin et al.

(10) Patent No.: US 11,993,327 B2
(45) Date of Patent: May 28, 2024

(54) METHOD FOR ESTIMATING AND ADJUSTING FRICTION TO BE ADJUSTED, AND CONTROLLING HYSTERESIS OF A STEERING WHEEL TORQUE, AND CORRESPONDING POWER STEERING SYSTEM

(71) Applicant: JTEKT EUROPE, Irigny (FR)

(72) Inventors: Nicolas Baudouin, Oullins (FR); Pierre Larminy, Billy sous les Cotes (FR)

(73) Assignee: JTEKT EUROPE, Irigny (FR)

(*) Notice: Subject to any disclaimer, the term of this patent is extended or adjusted under 35 U.S.C. 154(b) by 260 days.

(21) Appl. No.: 17/689,063

(22) Filed: Mar. 8, 2022

(65) Prior Publication Data

US 2022/0306190 A1   Sep. 29, 2022

(30) Foreign Application Priority Data

Mar. 24, 2021   (FR) ...................................... 21/02976

(51) Int. Cl.
*B62D 6/00* (2006.01)
*B62D 5/04* (2006.01)
*B62D 6/10* (2006.01)

(52) U.S. Cl.
CPC ........... *B62D 6/008* (2013.01); *B62D 5/0481* (2013.01); *B62D 6/10* (2013.01)

(58) Field of Classification Search
CPC ........ B62D 6/008; B62D 6/10; B62D 5/0481; B62D 5/0463
See application file for complete search history.

(56) References Cited

U.S. PATENT DOCUMENTS 10,974,761 B2 * 4/2021 Han ..................... B62D 5/0481
2002/0005314 A1 * 1/2002 Takehara ............. B62D 5/0466
180/443

(Continued)

FOREIGN PATENT DOCUMENTS

FR   3018917 B1   4/2016
FR   3070957 A1   3/2019

(Continued)

OTHER PUBLICATIONS

Wilhelm Frédéric et al., "Friction Compensation Control for Power Steering", IEEE Transactions on Control Systems Technology, IEEE Service Center, New York, NY, US, vol. 24, No. 4, pp. 1354-1367, Jul. 1, 2016.

*Primary Examiner* — George C Jin
(74) *Attorney, Agent, or Firm* — Oliff PLC

(57) ABSTRACT

Method for determining a friction to be adjusted in a power steering system or for modifying a hysteresis of a steering wheel torque applied to a steering wheel of the power steering system, the method including the following steps of: determining a speed, from a measurement of a speed of a part of the power steering system and/or a measurement of the steering wheel torque; determining the friction to be adjusted on the basis of a modified LuGre model, said modified LuGre model determining the friction to be adjusted as a function of a state of the system, a time derivative of the state being determined as a function of said state of the system, the speed, a first gain, and a coulomb friction, according to an equation of the form:

$$\dot{z} = v\left(1 - \alpha(z,v)\frac{\sigma_0 z}{F_c}\text{sign}(v)\right).$$ [Math 1]

10 Claims, 2 Drawing Sheets

(56) References Cited

U.S. PATENT DOCUMENTS

| | | | | |
|---|---|---|---|---|
| 2012/0232759 A1* | 9/2012 | Oniwa | ............... | B62D 6/008 |
| | | | | 701/41 |
| 2019/0256126 A1* | 8/2019 | George | ............. | G01M 17/02 |
| 2021/0122412 A1* | 4/2021 | Kim | ................. | B62D 5/0409 |
| 2022/0032995 A1* | 2/2022 | Minakawa | ........ | B62D 5/0463 |
| 2022/0177028 A1* | 6/2022 | Gaudin | ................ | G01L 3/26 |

FOREIGN PATENT DOCUMENTS

| | | |
|---|---|---|
| FR | 3095515 A1 | 10/2020 |
| WO | 2019/092341 A1 | 5/2019 |

\* cited by examiner

[Fig. 1]
[Fig. 2]
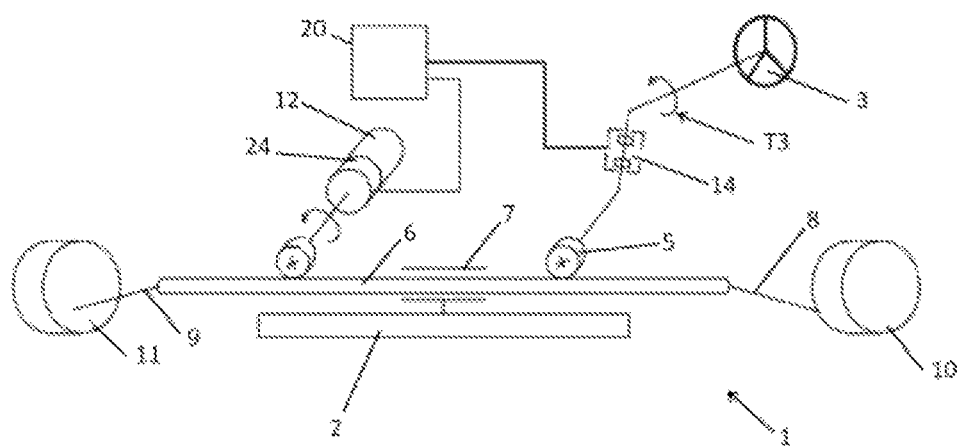

[Fig. 3]
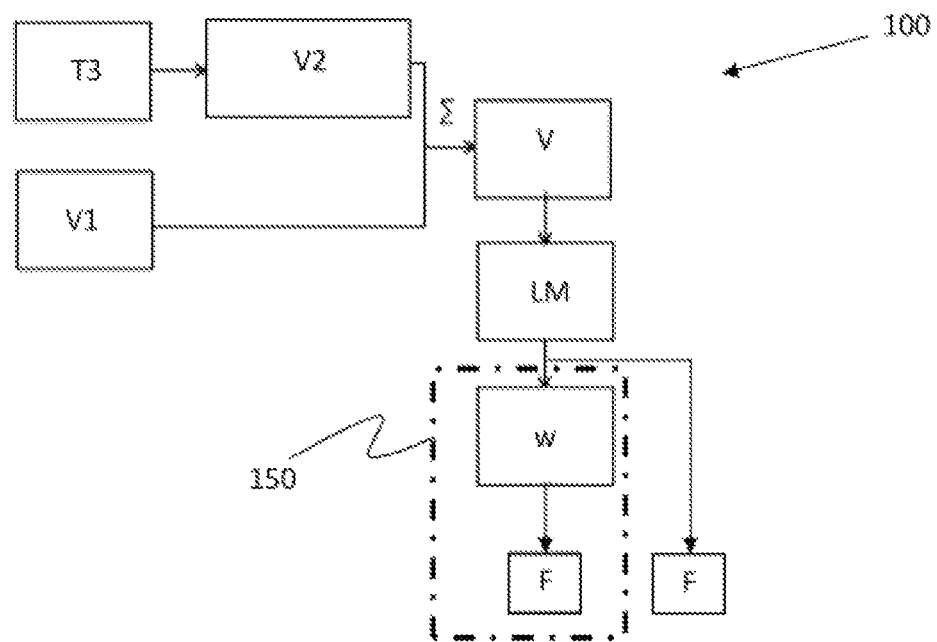
[Fig. 4]
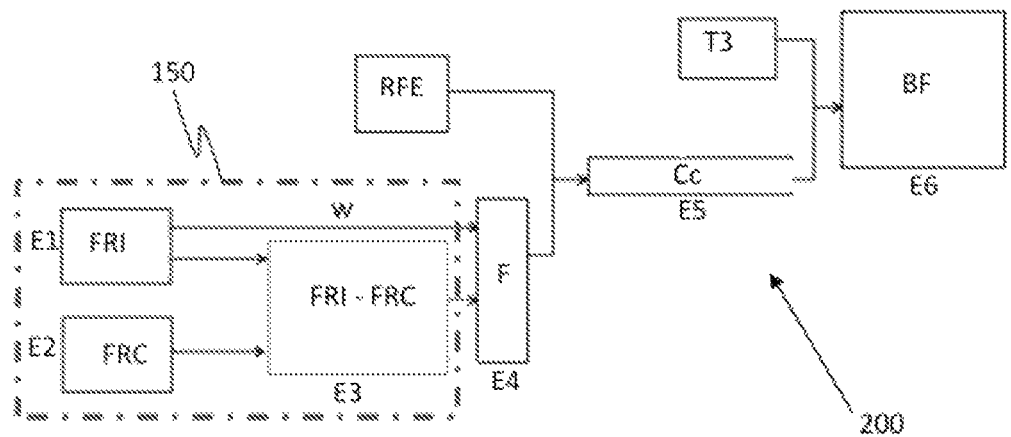

METHOD FOR ESTIMATING AND ADJUSTING FRICTION TO BE ADJUSTED, AND CONTROLLING HYSTERESIS OF A STEERING WHEEL TORQUE, AND CORRESPONDING POWER STEERING SYSTEM

The present invention concerns the field of power steering systems, and in particular methods for adjusting friction and improving the driver feeling at the steering wheel.

To reduce the impact, on the driver feeling, of the mechanical friction between the parts of the power steering system, it is known to adjust the friction by estimating it on the basis of a LuGre model. Moreover, the application of this method has revealed the following drawbacks: a loss of torque that is sometimes too pronounced in constant cornering, and too high sensitivity to the surface condition of the road. These drawbacks are all the more significant as the amount of compensated friction is important.

The object of the invention is therefore to propose a solution to all or part of these problems.

To this end, the present invention concerns a method for determining a friction F to be adjusted in a power steering system, the method comprising the following steps of:
- determining a speed v, from a measurement of the speed v of a part of the power steering system and/or from a measurement of a steering wheel torque applied to a steering wheel of the power steering system;
- determining the friction to be adjusted on the basis of a modified LuGre model,
said modified LuGre model determining the friction to be adjusted as a function of a state z of the system, a time derivative $\dot{z}$ of the state z of the system being determined as a function of said state and of the speed v, of a first gain $\sigma_0$, a second gain $\beta$, and a coulomb friction $F_c$, according to an equation of the form:

$$\dot{z} = v\left(1 - \alpha(z, v)\frac{\sigma_0 z}{F_c}\text{sign}(v)\right) \text{ in which:} \quad \text{[Math 1]}$$

$$\alpha(z, v) = \begin{cases} \alpha(z) & \text{if sign}(z) = \text{sign}(v) \\ 0 & \text{if sign}(z) \neq \text{sign}(v) \end{cases} \quad \text{[Math 2]}$$

where sign (z) is the sign of the quantity z and sign (v) is the sign of the quantity v, and in which, $$\alpha(z) = \begin{cases} 0 & \text{if } |z| \leq z_{ba} \\ \frac{1}{2}\left(\sin\left(\pi\frac{|z| - \frac{z_{max}(1+\beta)}{2}}{z_{max}(1-\beta)}\right) + 1\right) & \text{if } z_{ba} \leq |z| \leq z_{max} \\ 1 & \text{if } |z| \geq z_{max} \end{cases} \quad \text{with,} \quad \text{[Math 3]}$$

$$z_{max} = \frac{F_c}{\sigma_0} \text{ and with,} \quad \text{[Math 4]}$$

$$z_{ba} = \beta \cdot z_{max} \quad \text{[Math 5]}$$

According to these provisions, the value of the coefficient $\beta$ can be adjusted so that the loss of torque in constant cornering is less pronounced after adjustment of the friction, and so that the sensitivity to the surface condition of the road is less strong after adjustment of the friction, in particular when the value of the coefficient $\beta$ is close to 1.

According to an implementation mode, the invention comprises one or more of the following characteristics, alone or in a technically acceptable combination.

According to an implementation mode, the friction to be adjusted F is determined as a function of the state z by the equation:

$$F = \sigma_0 z \quad \text{[Math 6]}$$

According to an implementation mode, the friction to be adjusted F is determined as a function of the state z by the equation:

$$F = \sigma_0 z + \sigma_1 \dot{z} \quad \text{[Math 7]}$$

Where $\sigma_1$ is a second gain, representative of micro-damping.

According to an implementation mode, the friction to be adjusted F is determined as a function of the state z by the equation:

$$F = \sigma_0 z + \sigma_1 \dot{z} + \sigma_2 v \quad \text{[Math 8]}$$

Where $\sigma_2$ is a third gain, representative of a viscosity coefficient.

According to an implementation mode, the speed is an angular speed of an assist motor of the power steering system.

According to an implementation mode, the speed is measured by an angular speed sensor of the assist motor.

According to an implementation mode, the speed is measured by an angular speed sensor of the steering wheel.

According to an implementation mode, the speed is a relative speed between two parts.

According to an implementation mode, the Coulomb Friction $F_c$ and/or the first gain $\sigma 0$, and/or the second gain vary according to one or more of the following variables: a longitudinal speed of the vehicle, a lateral acceleration of the vehicle, a yaw rate of the vehicle, a steering wheel angle or a power steering motor angle, a speed of a steering wheel or a power steering motor, a temperature of a power steering system, an external temperature, a steering wheel torque, an motor torque.

According to an implementation mode, the step of determining the speed comprises the measurement of a first speed v1, by an angular speed sensor of an assist motor and the estimation of a second speed from a measurement of the steering wheel torque, said measurement of the steering wheel torque being carried out by a torque sensor, the determined speed being a sum of the first speed and the second speed.

According to these provisions, the sum of the first speed and the second speed makes it possible to take into account both the low stresses of the driver on the steering wheel, via the second speed, and the low stresses rising from the rolling surface and directly biasing the rack, via the first speed.

According to an implementation mode, the friction to be adjusted F is determined from an intermediate friction rate, the intermediate friction rate w being determined on the basis of the modified LuGre model and the speed v, the friction to be adjusted F being determined according to a step of calculating a product of the intermediate friction rate by a difference between an estimated dynamic friction and a desired dynamic friction, the estimated dynamic friction being estimated from at least the intermediate friction rate.

According to an implementation mode, the desired dynamic friction is determined from a mapping defined during a development phase.

According to an implementation mode, the estimation of the second speed comprises the following steps of:
- measuring of the steering wheel torque with the torque sensor configured to measure the steering wheel torque between the steering wheel and the electric power steering rack, time derivation of the steering wheel torque measurement, multiplying the time derivative by a stiffness coefficient, to obtain the second speed, called torque speed.

The invention also concerns a method for adjusting a friction to be adjusted in a power steering system or for modifying a hysteresis of a steering wheel torque applied to a steering wheel of the power steering system, the method comprising the following steps of:
- estimating the friction to be adjusted using the method according to any of the implementation methods described above,
- controlling an assist motor to apply a target steering wheel torque which adjusts the friction to be adjusted estimated in the previous step.

According to an implementation mode, the step of controlling the assist motor comprises the following steps of:
- determining the target steering wheel torque from a difference between the estimation of the friction to be adjusted, and an estimator of the rack force or «rack force estimator» representing a set of forces opposing the movement;
- closed-loop controlling of the assist motor based on the target steering wheel torque and the measured steering wheel torque.

According to an implementation mode, the target steering wheel torque is determined from a correspondence table, also called mapping, establishing a correspondence between a set of values of the difference between the estimation of the friction to be adjusted, and the rack force estimator, and a set of corresponding values of the target steering wheel torque.

According to these provisions, the hysteresis of the rack force estimator will present a controlled and desired hysteresis which will also impact the hysteresis at the level of the generation of the target torque.

The invention also concerns a method for controlling a hysteresis of a steering wheel torque by modifying the hysteresis of a target steering wheel torque by adding to a first target steering wheel torque a friction determined according to the method according to the invention, according to one embodiments described above, said method comprising the following steps of:
- determining the friction to be adjusted using the method to determine a friction to be adjusted according to the invention, according to one of the implementation modes described above,
- determining the target steering wheel torque by adding the friction to be adjusted to the first target steering wheel torque, said first target steering wheel torque being determined from an angle of the steering wheel,
- closed-loop controlling of the assist motor based on the target steering wheel torque and the measured steering wheel torque.

According to an implementation mode, the target steering wheel torque is determined from a correspondence table, or mapping, establishing a correspondence between a set of values of the difference between the angle of the steering wheel, and a set of corresponding values of the target steering wheel torque.

The invention also concerns a power steering system configured to implement the method for determining a friction to be adjusted, according to one of the implementation modes described above, or to implement the method for adjusting a friction, according to one of the implementation modes described above, or to implement a method for controlling a hysteresis of a steering wheel torque by modifying the hysteresis of a target steering wheel torque, according to one of the implementation methods described above.

The invention also concerns a vehicle comprising a power steering system configured to implement one of the methods according to the invention, according to one of the implementation modes described above.

For its good understanding, an embodiment and/or implementation mode of the invention is described with reference to the attached drawings representing, by way of non-limiting example, an embodiment or an implementation mode respectively of a device and/or a method according to the invention. The same references in the drawings designate similar elements or elements whose functions are similar.

FIG. 1 is a schematic view of a steering device to which the invention is applied, FIG. 2 is a graphic representation of a curve of the values of the alpha function as a function of the state of the power steering system to which the invention is applied, FIG. 3 is a representative diagram of a method for estimating friction according to an embodiment of the invention.

FIG. 4 is a representative diagram of a method for adjusting friction according to one embodiment of the invention.

In FIG. 1 is illustrated a steering device comprising a power steering making it possible to implement the estimation method of the invention as well as the adjustment method of the invention. In a manner known per se, and as can be seen in FIG. 1, said power steering device 1 comprises a steering wheel 3 which allows a driver to maneuver said power steering device 1 by exerting a force, called «steering wheel torque» T3, on said steering wheel 3. Said steering wheel 3 is preferably mounted on a steering column 4, guided in rotation on the vehicle 2, and which meshes, by means of a steering pinion 5, on a steering rack 6, which is itself guided in translation in a steering casing 7 fixed to said vehicle 2.

Preferably, the ends of said steering rack 6 are each connected to a steering tie-rod 8, 9 connected to the steering knuckle of a steered wheel 10, 11 (respectively a left wheel 10 and a right wheel 11), so that the longitudinal displacement in translation of the rack 6 makes it possible to modify the steering angle (yaw angle) of the steered wheels. The steered wheels 10, 11 can moreover preferably also be drive wheels.

The power steering device 1 also comprises a motor 12 configured to assist the maneuver of said power steering device 1. The motor 12 will preferably be an electric motor, with two directions of operation, and preferably a rotary electric motor, of the «brushless» type.

The power steering device 1 further comprises a steering wheel torque sensor 14 placed specially within the power steering device 1, for example on the steering column 4, in order to measure the steering wheel torque T3, and having as main purpose, even exclusively, to provide a measurement of the steering wheel torque T3, regardless of the measurement technology used by said steering wheel torque sensor 14. In addition, the power steering device 1 comprises an engine speed sensor 24 intended to measure the speed of rotation of the engine 12.

Finally, the power steering device 1 also comprises a calculation and control unit 20 configured to implement the estimation method and the adjustment method based on data from sensors 14, 24.

As illustrated in FIG. 3, according to an implementation mode of the method 100 for estimating a friction to be adjusted F comprises a step of measuring a first speed v1 by means of a speed sensor 24 of the electric motor 12 of the vehicle power steering system 1. The estimation method 100 comprises a step of determining a second speed v2, comprising a sub-step of measuring the steering wheel torque T3, and a sub-step of time derivation of the measurement of the steering wheel torque T3 in which a derivative gain is applied. The estimation method comprises a step of calculating a sum v of the first and second speeds v1, v2, represented by the reference Σ. A speed v called the steering wheel speed is then obtained. The next step in the estimation method 100, represented by the box LM, consists in simulating a simplified one-dimensional (one mass) steering model and a friction according to a modified LuGre model LM, whose only input speed is the steering wheel speed v obtained in the previous step. An estimate of the friction to be adjusted by the power steering 1 is thus obtained.

According to these provisions, the sum of the first speed and the second speed makes it possible to take into account both the low stresses of the driver on the steering wheel, via the second speed, and the low stresses rising from the rolling surface and directly stressing the rack, via the first speed Said modified LuGre model LM makes it possible to determine the friction to be adjusted F as a function of a state of the system, a time derivative $\dot{z}$ of the state z being determined as a function of said state z of the speed v, of a first gain $\sigma_0$, and a coulomb friction $F_c$, according to an equation of the form:

$$\dot{z} = v\left(1 - \alpha(z, v)\frac{\sigma_0 z}{F_c}\text{sign}(v)\right) \text{ in which:} \quad [\text{Math 1}]$$

$$\alpha(z, v) = \begin{cases} \alpha(z) & \text{if sign}(z) = \text{sign}(v) \\ 0 & \text{if sign}(z) \neq \text{sign}(v) \end{cases} \quad [\text{Math 2}]$$

where sign (z) is the sign of the quantity z and sign (v) is the sign of the quantity v, and in which, $$\alpha(z) = \begin{cases} 0 & \text{if } |z| \leq z_{ba} \\ \frac{1}{2}\left(\sin\left(\pi\frac{|z| - \frac{z_{max}(1+\beta)}{2}}{z_{max}(1-\beta)}\right) + 1\right) & \text{if } z_{ba} \leq |z| \leq z_{max} \text{ with,} \\ 1 & \text{if } |z| \geq z_{max} \end{cases} \quad [\text{Math 3}]$$

$$z_{max} = \frac{F_c}{\sigma_0} \text{ and with,} \quad [\text{Math 4}]$$

$$z_{ba} = \beta \cdot z_{max} \quad [\text{Math 5}]$$

FIG. 2 graphically presents the evolution of the function a(z) as a function of the state z and in particular for the particular values $-z_{max}, -z_{ba}, z_{ba},$ and $z_{max}$.

According to these provisions, the value of the coefficient β can be adjusted so that the loss of torque in constant cornering will be less pronounced after adjustment of the friction, and so that the sensitivity to the surface condition of the road is less strong after adjustment of the friction, especially when the value of the coefficient β is close to 1.

In particular, the friction to be adjusted F is determined as a function of the state z by the equation:

$$F = \sigma_0 z \quad [\text{Math 6}]$$

More particularly, the friction to be adjusted F is determined directly as a function of the state z by the equation:

$$F = \sigma_0 z + \sigma_1 \dot{z} \quad [\text{Math 7}]$$

Where $\sigma_1$ is a second gain, representative of a microdamping.

Even more particularly, the friction to be adjusted F is determined as a function of the state z by the equation:

$$F = \sigma_0 z + \sigma_1 \dot{z} + \sigma_2 v \quad [\text{Math 8}]$$

Where $\sigma_2$ is a third gain, representative of a viscosity coefficient.

According to a particular example, instead of being the sum of a first speed and a second speed according to the previous example, the speed v can be the angular speed of the assist motor 12 of the power steering system 1, measured by an angular speed sensor of the assist motor 12.

According to another example, the speed is a relative speed between two parts of the power steering system 1.

According to an implementation example, the method 100 makes it possible to obtain an estimate of an intermediate friction rate w of the power steering 1, from which an estimate of the friction to be adjusted is calculated, for example according to the step 150 described below, with reference to FIG. 4.

The friction to be adjusted F is determined from an intermediate friction rate w, according to the step 150 comprising the calculation E4 of a product of the intermediate friction rate w by a difference E3 between an estimated dynamic friction FRI and a desired dynamic friction FRC, the estimated dynamic friction FRI being estimated, during a step E1, from at least the intermediate friction rate w, and the desired dynamic friction FRC being obtained, during a step E2, for example from a mapping adjusted during a development phase.

The estimated dynamic friction is for example estimated according to one of the methods described in one of the following patent documents: FR3070957B1, or FR3095515A1, or even FR3018917B1.

As illustrated in FIG. 4, the invention also concerns a method 200 for adjusting a friction to be adjusted F in a power steering system 1 or for modifying a hysteresis of a steering wheel torque T3 applied to a steering wheel 3 of the power steering system 1, the method comprising the following steps of:

estimating the friction to be adjusted F using the method 100 according to one of the implementation modes described above, controlling the assist motor 12 to apply a target steering wheel torque Cc which compensates for the friction to be adjusted F estimated in the previous step.

In particular, the step of controlling the assist motor 12 comprises:

a step E5 of determining the target steering wheel torque Cc from a difference between the estimation of the friction to be adjusted F, and an estimator of the rack force or «rack force estimator» representing a set of forces opposing the movement RFE;

a step E6 of closed loop BF controlling the assist motor 12 on the basis of the target steering wheel torque Cc and the measured steering wheel torque T3.

According to an example, the target steering wheel torque is determined from a correspondence table, also called mapping, establishing a correspondence between a set of values of the difference between the estimation of the friction to be adjusted F, and the estimator of the rack force RFE, and a set of corresponding values of the target steering wheel torque Cc.

According to these provisions, the hysteresis of the rack force estimator will present a controlled and desired hysteresis, which will also impact the hysteresis at the level of the generation of the target torque.

For example, the electric power steering is at 400N of friction and a feeling of 300N is desired, the friction estimator FRI will identify that the steering is at 400N, and the desired friction value entry will be 300N. The difference is therefore 100N, the determined estimate of all the forces opposing the movement is 400N and 100N is deducted from it so that the friction corresponds to the desired value of 300N.

The invention also concerns a method for controlling a hysteresis of a steering wheel torque T3 by modifying the hysteresis of a target steering wheel torque Cc by adding a friction determined according to the method according to the invention, according to one of the implementation modes described above, said method comprising the following steps of:
- determining the friction to be adjusted F using the method according to any of claims 1 to 4,
- determining the target steering wheel torque Cc by adding the friction to be adjusted F to a first target steering wheel torque Cc determined from a steering wheel angle
- closed-loop BF controlling of the assist motor 12 on the basis of the target steering wheel torque Cc and the measured steering wheel torque T3.

According to an example, the target steering wheel torque is here determined from a correspondence table, or mapping, establishing a correspondence between a set of values of the difference between the angle of the steering wheel, and a set of corresponding values of the target steering wheel torque Cc.

The invention also concerns a power steering system configured to implement the method 100 according to the invention, to determine a friction to be adjusted F, or to implement the method 200 according to the invention, to adjust the friction to be adjusted F, or even to implement the method according to the invention, to control a hysteresis of a steering wheel torque T3 by modifying the hysteresis of a target steering wheel torque Cc.

The invention also concerns a vehicle equipped with a power steering system configured to implement the method 100 according to the invention, to adjust a friction to be adjusted.

The invention claimed is:

1. A method for determining a friction to be adjusted (F) in a power steering system, the method comprising the following steps:
- determining a speed (v), from a measurement of a speed (v) of a part of the power steering system and/or from a measurement of a steering wheel torque (T3) applied to a steering wheel of the power steering system;
- determining the friction to be adjusted (F) on the basis of a modified LuGre model (LM),
- said modified LuGre model (LM) determining the friction to be adjusted (F) as a function of a state (z) of the system, a time derivative ($\dot{z}$) of the state (z) being determined as a function of said state (z) of the system, the speed (v), a first gain ($\sigma 0$), a second gain ($\beta$), and a coulomb friction ($F_c$), according to an equation of the form:

$$\dot{z} = v\left(1 - \alpha(z, v)\frac{\sigma_0 z}{F_c}\text{sign}(v)\right) \text{ in which:} \quad [\text{Math 1}]$$

$$\alpha(z, v) = \begin{cases} \alpha(z) & \text{if sign}(z) = \text{sign}(v) \\ 0 & \text{if sign}(z) \neq \text{sign}(v) \end{cases} \quad [\text{Math 2}]$$

where sign (z) is the sign of the quantity z and sign (v) is the sign of the quantity v, and in which, $$\alpha(z) = \begin{cases} 0 & \text{if } |z| \leq z_{ba} \\ \frac{1}{2}\left(\sin\left(\pi\frac{|z| - \frac{z_{max}(1+\beta)}{2}}{z_{max}(1-\beta)}\right) + 1\right) & \text{if } z_{ba} \leq |z| \leq z_{max} \\ 1 & \text{if } |z| \geq z_{max} \end{cases} \quad [\text{Math 3}]$$

with, $$z_{max} = \frac{F_c}{\sigma_0} \text{ and with,} \quad [\text{Math 4}]$$

$$z_{ba} = \beta \cdot z_{max}. \quad [\text{Math 5}]$$

2. The method according to claim 1, wherein the Coulomb Friction F, and/or the first gain ($\sigma 0$), and/or the second gain $\beta$ vary according to one or more of the following variables: a longitudinal speed of the vehicle, a lateral acceleration of the vehicle, a yaw rate of the vehicle, a steering wheel angle or a power steering motor angle, a steering wheel speed or a power steering motor speed, a temperature of the power steering system, an external temperature, a steering wheel torque, a motor torque.

3. The method according to claim 1, the step of determining the speed comprises the measurement of a first speed (v1), by an angular speed sensor of an assist motor and the estimation of a second speed (v2) from a measurement of the steering wheel torque (T3), said measurement of the steering wheel torque being carried out by a torque sensor, the determined speed (v) being a sum the first speed (v1) and the second speed (v2).

4. The method according to claim 1, wherein the friction to be adjusted (F) is determined from an intermediate friction rate (w), the intermediate friction rate (w) being determined on the basis of the modified LuGre model (LM) and the speed (v), the friction to be adjusted (F) being determined according to a step of calculating a product of the intermediate friction rate (w) by a difference between an estimated dynamic friction (FRI) and a desired dynamic friction (FRC), the estimated dynamic friction (FRI) being estimated from at least the intermediate friction rate (w).

5. The method according to claim 3, wherein the estimation of the second speed (v2) comprises the following steps of:
- measuring of the steering wheel torque (T3) with the torque sensor configured to measure the steering wheel torque (T3) between the steering wheel and the rack of the electric power steering,
- time derivation of the steering wheel torque measurement (T3),
- multiplying the time derivative by a stiffness coefficient to obtain the second speed (v2), called torque speed.

6. A method for adjusting a friction to be adjusted (F) in a power steering system, the method comprising the following steps of:
- estimating the friction to be adjusted (F) using the method according to claim 1,
- controlling an assist motor to apply a target steering wheel torque (Cc) which adjusts the friction to be adjusted (F) estimated in the previous step.

7. The method according to claim 6, the step of controlling the assist motor comprising the following steps of:
- (E5) determining the target steering wheel torque (Cc) from a difference between the estimate of the friction to be adjusted (F), and an estimator of the rack force or «rack force estimator» representing a set of forces opposing the movement (RFE);
- (E6) closed loop controlling (BF) the assist motor on the basis of the target steering wheel torque (Cc) and the measured steering wheel torque (T3).

8. A method for controlling a hysteresis of a steering wheel torque (T3) by modifying the hysteresis of a target steering wheel torque (Cc) by adding to a first target steering wheel torque a friction determined according to the method according to claim 1, said method comprising the following steps of:
- determining the friction to be adjusted (F) using the method according to claim 1,
- determining the target steering wheel torque (Cc) by adding the friction to be adjusted (F) to the first target steering wheel torque (Cc), said first target steering wheel torque being determined from an angle of the steering wheel,
- closed loop controlling (BF) the assist motor on the basis of the target steering wheel torque (Cc) and the measured steering wheel torque (T3).

9. A power steering system (1) configured to implement a method for determining a friction to be adjusted (F) according to claim 1, or to implement a method for adjusting a friction (F) comprising the following steps of:
- estimating the friction to be adjusted (F) using the method according to claim 1,
- controlling an assist motor to apply a target steering wheel torque (Cc) which adjusts the friction to be adjusted (F) estimated in the previous step, or to implement a method for controlling a hysteresis of a steering wheel torque (T3) by modifying the hysteresis of a target steering wheel torque (Cc) by adding to a first target steering wheel torque a friction determined according to the method according to claim 1, said method comprising the following steps of:
- determining the friction to be adjusted (F) using the method according to claim 1,
- determining the target steering wheel torque (Cc) by adding the friction to be adjusted (F) to the first target steering wheel torque (Cc), said first target steering wheel torque being determined from an angle of the steering wheel,
- closed loop controlling (BF) the assist motor on the basis of the target steering wheel torque (Cc) and the measured steering wheel torque (T3).

10. A vehicle comprising a power steering system according to claim 9.

\* \* \* \* \*